(12) United States Patent
Pohl (10) Patent No.: US 10,773,113 B2
(45) Date of Patent: Sep. 15, 2020

(54) FIRE EXTINGUISHING SYSTEM VALVE AND FIRE EXTINGUISHING SYSTEM HAVING SUCH A VALVE

(71) Applicant: MINIMAX GMBH & CO. KG, Bad Oldesloe (DE)

(72) Inventor: Matthias Pohl, Stubben (DE)

(73) Assignee: Minimax GmbH & Co. KG, Bad Oldesloe (DE)

( * ) Notice: Subject to any disclaimer, the term of this patent is extended or adjusted under 35 U.S.C. 154(b) by 174 days.

(21) Appl. No.: 15/537,354

(22) PCT Filed: Dec. 17, 2015

(86) PCT No.: PCT/EP2015/080328
§ 371 (c)(1),
(2) Date: Jun. 16, 2017

(87) PCT Pub. No.: WO2016/097201
PCT Pub. Date: Jun. 23, 2016

(65) Prior Publication Data
US 2018/0264302 A1    Sep. 20, 2018

(30) Foreign Application Priority Data

Dec. 19, 2014 (DE) .................. 10 2014 226 639

(51) Int. Cl.
*A62C 37/50* (2006.01)
*A62C 35/68* (2006.01)
(Continued)

(52) U.S. Cl.
CPC ............. *A62C 37/50* (2013.01); *A62C 35/60* (2013.01); *A62C 35/605* (2013.01); *A62C 35/68* (2013.01);
(Continued)

(58) Field of Classification Search
CPC ......... A62C 37/50; A62C 35/68; A62C 37/44; F16K 1/20; F16K 27/0227; F16K 37/0041; F16K 37/005
See application file for complete search history.

(56) References Cited

U.S. PATENT DOCUMENTS 3,187,499 A    6/1965  Wayne
3,307,633 A *  3/1967  Newall ............... A62C 35/605
                                                  169/20
(Continued)

FOREIGN PATENT DOCUMENTS

CN    203431188 U    2/2014
CN    203777565 U    8/2014
(Continued)

OTHER PUBLICATIONS

Japanese Office Action dated Jul. 3, 2018 with English translation (corresponding to JP 2017-532754).
(Continued)

*Primary Examiner* — Tuongminh N Pham
(74) *Attorney, Agent, or Firm* — Perkins Coie LLP (57) ABSTRACT

A fire extinguishing system valve (1) comprising a housing (2, 3) which has a fluid inlet chamber (8), a fluid outlet chamber (9) and a closing body (4a) reciprocable between a blocking state and a release state, wherein the fluid inlet chamber (8) and the fluid outlet chamber (9) are separated from each other in the blocking state and communicate with each other in fluid-conducting relationship in the release state. At least one pressure sensor (6) is integrated in the housing (2, 3).

21 Claims, 3 Drawing Sheets (51) Int. Cl.
| | |
|---|---|
| *A62C 37/44* | (2006.01) |
| *F16K 37/00* | (2006.01) |
| *F16K 27/02* | (2006.01) |
| *F16K 1/20* | (2006.01) |
| *A62C 35/60* | (2006.01) |
| *F16K 15/03* | (2006.01) |
| *F16K 27/12* | (2006.01) |

(52) U.S. Cl.
CPC ............... *A62C 37/44* (2013.01); *F16K 1/20* (2013.01); *F16K 15/033* (2013.01); *F16K 27/0227* (2013.01); *F16K 27/12* (2013.01); *F16K 37/005* (2013.01); *F16K 37/0041* (2013.01); *Y10T 137/8326* (2015.04)

(56) References Cited

U.S. PATENT DOCUMENTS

| | | | |
|---|---|---|---|
| 5,992,532 | A | 11/1999 | Ramsey et al. |
| 7,530,402 | B2 | 5/2009 | Cabral |
| 7,621,898 | B2 | 11/2009 | Lalomia et al. |
| 7,633,393 | B2 | 12/2009 | Bonne |
| 9,072,924 | B2 | 7/2015 | Capsius |
| 9,526,933 | B2 | 12/2016 | Kochelek |
| 9,677,691 | B2 | 6/2017 | Multer et al. |
| 9,974,991 | B2 | 5/2018 | Ernfjäll et al. |
| 2002/0029808 | A1 | 3/2002 | Friend et al. |
| 2003/0011136 | A1* | 1/2003 | Ramirez .......... F16K 1/446 277/500 |
| 2003/0234051 | A1 | 12/2003 | Toivonen et al. |
| 2007/0068225 | A1 | 3/2007 | Brown |
| 2007/0289751 | A1 | 12/2007 | Feenstra et al. |
| 2008/0224877 | A1 | 9/2008 | Young |
| 2008/0277125 | A1 | 11/2008 | Wilkins et al. |
| 2011/0056709 | A1 | 3/2011 | Feenstra |
| 2013/0098641 | A1 | 4/2013 | Capsius |
| 2014/0014187 | A1 | 1/2014 | Hunt et al. |
| 2014/0048290 | A1 | 2/2014 | Bodemann |
| 2016/0069473 | A1* | 3/2016 | Kucera .......... F16K 37/0041 137/637 |
| 2017/0326396 | A1 | 11/2017 | Pohl et al. |
| 2017/0348557 | A1 | 12/2017 | Pohl et al. |

FOREIGN PATENT DOCUMENTS

| | | |
|---|---|---|
| DE | 19904477 A1 | 8/2000 |
| DE | 102007049588 A1 | 4/2009 |
| EP | 2 687 763 A1 | 1/2014 |
| JP | H03 178673 A | 8/1991 |
| JP | H07-116284 A | 5/1995 |
| JP | H07 204290 | 8/1995 |
| JP | H10 179790 | 7/1998 |
| JP | 2001-112882 A | 4/2001 |
| JP | 2001-271962 A | 10/2001 |
| JP | 3292567 B2 | 6/2002 |
| JP | 2003-010356 A | 1/2003 |
| JP | 2003-062111 A | 3/2003 |
| JP | 2003-088596 A | 3/2003 |
| JP | 2004-160027 A | 6/2004 |
| JP | 2005-040451 A | 2/2005 |
| JP | 2005-058460 A | 3/2005 |
| JP | 3 685 883 B2 | 8/2005 |
| JP | 2012-055505 A | 3/2012 |
| JP | 2012-217777 A | 11/2012 |
| JP | 2013-085914 A | 5/2013 |
| KR | 2004 629 910000 | 10/2012 |
| WO | 1990/15948 A1 | 12/1990 |
| WO | 2010063266 A1 | 6/2010 |
| WO | WO 2012/124349 A1 | 3/2012 |

OTHER PUBLICATIONS

Chinese Office Action dated Jul. 2, 2018 with English translation (corresponding to CN 201580069768.7).
European Patent Office, European Office Action and English translation issued in European Patent Application No. EP15819811.9-1113, dated Jan. 9, 2019, 11 pages.
Eurasian Patent Office, Eurasian Office Action and English translation issued in Eurasian Patent Application No. 201791395/31, dated Jan. 8, 2019, 6 pages.

* cited by examiner

FIRE EXTINGUISHING SYSTEM VALVE AND FIRE EXTINGUISHING SYSTEM HAVING SUCH A VALVE

CROSS-REFERENCE TO RELATED APPLICATIONS

This application is a National Stage of International Application No. PCT/EP2015/080328, filed Dec. 17, 2015 (now WO 2016/097201A1, published Jun. 23, 2016), which is based on German Application No. 102014226639.4, filed Dec. 19, 2014. The entire disclosures of each of the above applications are incorporated herein by reference.

FIELD

The disclosure concerns a fire extinguishing system valve comprising a housing which has a fluid inlet chamber, a fluid outlet chamber and a closing body reciprocable between a blocking state and a release state, wherein the fluid inlet chamber and the fluid outlet chamber are separated from each other in the blocking state and communicate with each other in fluid-conducting relationship in the release state.

BACKGROUND AND SUMMARY

The term fire extinguishing system valves is used in accordance with the present disclosure to denote the general kind of both passive and also active alarm valves which are designed for use in fire extinguishing systems, specifically fire extinguishing systems with water-based extinguishing agents (for example water and water with additives). The most prominent representatives of those types of valves are wet and dry alarm valves, as well as spray water valves.

In that respect the term passive alarm valves is used to mean that they automatically open when a predetermined pressure difference between the inlet and outlet sides is exceeded, an alarm is triggered by the valves themselves in reaction to the detection of that open state, for example indirectly by means of a pressure switch which is arranged in an external alarm passage and by way of which an alarm means like for example an electrically operated alarm bell is then controlled, and/or directly by control of the flow of an extinguishing agent to a hydraulically operated alarm means which is fluidically connected to the alarm valve, like for example a water-operated alarm bell. In part, instead of or in addition to hydraulically operated alarm bells, optical displays are also arranged in the region of the alarm valves so that, when a plurality of alarm valves arranged in parallel are involved, it is possible to better distinguish which of the alarm valves was opened.

The term active alarm valves is used to mean that the valves, after the input of a fire signal from an external fire detection means or as a function of external control interventions, actively enable the flow of fluid by opening of the valve and an alarm is triggered, as in the case of the passive alarm valves. What is common to the above-mentioned types of valve is that they are often installed in fire extinguishing systems over long period of time without having to be used and it is important for the valves to operate reliably in an emergency. This means that regular checking of the operability of the valves is indispensable.

It is known in the state of the art to provide external pipe systems in the region of the alarm valves and to connect to those pipe systems devices for pressure measurement, for example manometers and/or pressure switches. In that way, it is possible for example to detect the pressure in the fluid inlet chamber. It is also known to fit devices with which an alarm valve is to be briefly opened even without a fire occurring in order to be able to regularly check whether the valves are functioning in the predetermined fashion.

In the low-pressure field of classic sprinkler and spray water extinguishing systems up to about 25 bars, in accordance with the state of the art external pipe systems are often produced using threaded fittings, in part also on the building site. The effort and involvement in preparing, fitting and optically appropriately aligning as well as providing for fluid-tight and pressure-tight connection of the external arranged components is significant. In addition externally arranged components require appropriate space in the installation area. And finally in the case of externally arranged pipe systems there is also the risk that they may be damaged when being transported to the installation location insofar as they are already assembled in the manufacturer's factory.

In accordance with the state of the art, in the case of alarm valves with electrically operated alarm means or displays, it is necessary to make an electrical connection between electrical pressure switches arranged near the alarm valve and a usually remotely arranged fire signalling or monitoring centre and back again from the fire signalling or monitoring centre to the electrical alarm means arranged near the alarm valve or to the display. Such electrical connections between elements which are arranged spatially separated from each other can be easily interrupted, in particular when relatively great distances are involved, and they therefore represent a safety risk in fire extinguishing systems.

Consequently the object of the disclosure is to reduce the apparatus and time involvement in manufacture/assembly of the alarm valves of fire extinguishing systems, and in particular to enhance operational reliability.

The disclosure attains its object in that it provides a fire extinguishing system valve of the kind set forth in the opening part of this specification in which a pressure sensor is integrated in the housing. In accordance with the disclosure integrated is used to mean that the pressure sensor is installed in the housing of the valve, in other words it is mounted or encased therein, in such a way that no flanges, pipe connections or the like as additional fluid-carrying fitments have to be provided externally on the valve or indeed separately in relation to the valve in order to be able to perform the above-mentioned pressure measurement.

In that respect the disclosure is based on the central concept that the number of components to be installed in the fire extinguishing system is markedly reduced by integration of the function of the pressure sensor in the valve housing. Assembly and packaging of the fire extinguishing system valve is also preferably already completed in manufacture, that is to say before being taken to the location of use and prior to the actual fitment operation, so that the time factor can also be already minimised when the fire extinguishing system is being commissioned. Further preferably the use of the alarm valve according to the disclosure in one of the described embodiments makes it possible to dispense with electrical connecting lines:

a) between electrically operated alarm means or displays arranged near the alarm valve and a remotely arranged fire signalling and/or extinguishing control center, and b) between pressure sensors arranged near the alarm valve and a remotely arranged fire signalling and/or extinguishing control center.

The integrated pressure sensor is preferably adapted to detect the pressure prevailing in the fluid inlet chamber. In an embodiment a pressure sensor in the form of a pressure switch is preferred, which as it were digitally registers when the pressure reaches a limit value or rises above/falls below the limit value. A pressure limit value is predetermined with the choice of a pressure switch or a defined setting of the pressure switch. The pressure switch supplies as pressure data the information as to whether the switching pressure applies or not (1/0). A pressure measuring pickup is particularly preferred, which can detect the actually applied pressure and output it in the form of a discrete signal value by means of suitable conversion means. In preferred embodiments the pressure sensor can have converters, amplifiers, microcontrollers and the like which are required for that purpose in generally known fashion.

Further preferably the pressure sensor is adapted to detect the pressure prevailing in the fluid outlet chamber and/or in the fluid inlet chamber. If the pressure is to be detected both in the fluid inlet chamber and also in the fluid outlet chamber it is preferred that there are provided a first pressure sensor and a second pressure sensor which are both integrated in the housing and of which a respective pressure sensor is operatively arranged in the fluid inlet or fluid outlet chamber.

In that respect, the pressure sensor or a measuring head of the pressure sensor can be arranged selectively directly in the fluid inlet chamber, the fluid outlet chamber, or in an alarm passage integrated in the valve. The alarm passage is preferably fluid-tightly separated from the fluid chambers of the valve in the blocking position of the closing body. Preferably ambient pressure prevails in the alarm passage. It is only when the closing body is moved from the blocking position into the release position that the alarm passage communicates with the adjoining fluid chambers which are now also connected.

In a preferred embodiment of the disclosure which additionally represents a separate aspect of the disclosure a display unit is integrated in the housing. The display unit is preferably adapted to reproduce numerical values and/or text characters, for example in the form of an LCD or LED display. Alternatively or in addition the display however for example in an economical structural configuration may also have only individual LEDs or other lighting means adapted to reproduce digitally given states by lighting or not lighting up. Such lighting means are particularly preferable if the pressure is in the form of a pressure switch.

In a further preferred embodiment the pressure sensor is preferably connected to a display unit, preferably to the display integrated in the housing, for output of the detected pressure data and/or for output of information ascertained in dependence on the detected pressure data. The use of the alarm valve according to the disclosure in this embodiment allows the user to have displays, near the alarm valve, relating to certain operating states which go beyond pure pressure information, for example recommendations/instructions, in the form of clear text.

In a further preferred embodiment the pressure sensor is connected to a data memory for storing the detected pressure data. That makes it possible to not merely detect the respectively instantaneous pressure value, but to detect a history of the variation in the pressure value and provide it for subsequent evaluation.

In a particularly preferred configuration of the disclosure the display unit is connected to the data memory and/or one or more external pressure sensors and is adapted to output the pressure data stored there or communicated therefrom. For example the display unit is adapted to output the values of the last hours, days, weeks or months and also the detected maximum and minimum values and possibly the rise and fall rates.

In a further preferred embodiment the integrated pressure sensor and/or the data memory and/or one or more external pressure sensors are connected to the data interface for reading out and remotely transmitting the detected pressure data. The data interface preferably includes one or more connections for data communication.

Preferably the data interface is adapted for the operating voltage supply for the elements integrated in the valves. In this case the term remote transmission is used to denote both wired and also wireless data transfer. By means of the data interface the detected pressure data of the pressure sensor and/or pressure data from the data memory and/or pressure from externally arranged pressure sensors communicating with the data interface can be passed to an external data processing unit, preferably of a fire extinguishing system, for example to a fire signalling and/or extinguishing control center. That makes it possible to check the operability of the fire extinguishing system valve by means of signal-technology processing and evaluation of the pressure data arriving there, without having to carry out an on-site inspection. It is only when, due to certain pressure data patterns, for example abrupt pressure drops, there is an indication that the functioning of the valve is limited that an on-site inspection can be performed at the respective situation. Moreover, the transmission of the pressure data by means of the data interface permits actuation, triggered by means of the data processing unit, of additional external display means, preferably acoustic and/or optical alarm means and further (alpha numeric) displays.

Alternatively or in addition to external data evaluation the fire extinguishing system valve in a preferred embodiment itself has an electronic evaluation unit, which is connected to one, more or all following elements for receiving data and/or for transmitting state information of the valve: the at least one integrated pressure sensor, the display unit, the data interface, the data memory, and one or more external pressure sensors. Reception of data is considered in particular from the pressure sensor and the data memory. Transmission of data is effected in particular in the direction of the display unit and/or the data interface. Among state information according to the disclosure are in particular the locking and release state of the closing body and further preferably the location of the valve, the valve type and the pressure data received from the pressure sensor and/or the data memory and possibly data processing results which the electronic evaluation unit has implemented on the basis of the received data. Preferably a so-called addressing module is provided in the electronic evaluation unit for networking the valve by means of the data interface generally and for location communication in particular. If the data interface is in the form for example of a ring bus the evaluation unit, by means of the addressing module, can output the location in addition to or jointly with the information in respect of the pressure data.

The addressing module is preferably adapted to be plugged in and/or interchangeable, being connected by way of a signal line to a ring bus subscriber module of a central control unit, for example a fire signalling and/or extinguishing control center. In that way the addressing module is an addressable subscriber on the signal line which is preferably in the form of a ring bus line. Preferably the address of the addressing module is settable. The addressing module sends data by way of the ring bus. In a preferred configuration the detected pressure values or detected changes in pressure or the occurrence of a change in pressure or disturbances are transmitted to the ring bus subscriber module by means of a data transmission protocol.

In an advantageous embodiment the signal line is in the form of a closed ring bus line. That has the advantage that, upon an interruption in that signal line, for example in the event of wire breakage, the power supply and communication with the addressable subscribers is ensured from both sides of the former ring by way of the ring bus subscriber module. In a further advantageous configuration that signal line is in the form of a stub line for addressable subscribers.

The electronic evaluation unit is preferably adapted to compare pressure data obtained from the pressure sensor and/or the data memory and/or one or more external pressure sensors to predefine limit values and, when the pressure reaches or rises above or falls below those limit values, to transmit a representative signal as a state definition.

In a further preferred embodiment of the fire extinguishing system valve the closing body has a control drive and the electronic evaluation unit is adapted to move the closing body into the release or blocking position by means of the control drive. In that respect the control drive can be an electrical or electromagnetic, hydraulic or pneumatic control drive, which is known in principle, each with a suitable actuating means.

Particularly preferably in addition to the pressure sensor one, more or all of the following elements are integrated in the housing: the display unit: the data interface, the data memory and the electronic evaluation unit.

In a further preferred development of the disclosure the housing has a housing cover, preferably a hand hole cover, wherein in particular one, more or all of the following elements are integrated in the housing cover: the pressure sensor, the display unit, the data interface, the data memory and the electronic evaluation unit. In that way it is possible to reduce the component diversity in a series of fire extinguishing system valves without having to compromise function diversity. It is possible to produce a universal housing body which has suitable openings for all functionalities afforded and housing covers of differing configuration. By allocating the respective housing cover with its functionalities integrated therein with the universal housing body the respectively different functions of the fire extinguishing system valve are then brought together. That modular system according to the disclosure further makes it possible subsequently, in relation to existing fire extinguishing systems, to add additional functions or to remove functions which are not required in practice, by changing the housing cover. All that is achieved without removing fitments on the existing fire extinguishing system or having to subsequently install same, which would respectively involve a high level of cost and complication and possible leaks. The housing cover, for example in the embodiment in the form of a hand hole cover, preferably has known and tried-and-tested sealing mechanisms which allow reliable use.

The housing cover, in particular in the form of a hand hole cover, upon temporary removal thereof, preferably allows access to the fluid inlet chamber and/or fluid outlet chamber and particularly preferably the closing body. When the pressure sensor is integrated in the housing cover suitable fluid line passages are preferably provided for the pressure sensor or, when there are a plurality of pressure sensors, for each pressure sensor, the passage is being in the form of recesses in which the pressure sensor can respectively be placed. It is possible for example to use sensors with integrated A/D converter, as well as optionally amplifiers, microcontrollers and the like, or sensors which are connected to an A/D converter also integrated in the housing cover. Simpler types of sensor, like for example pressure switches, can similarly be disposed in the housing cover. The same also applies to the other above-mentioned integration elements.

The fire extinguishing system valve according to the disclosure, as already mentioned, is particularly preferably a wet alarm valve or a dry alarm valve or a spray water valve. This also embraces "special configurations" of those types of alarm valve and combinations thereof, as are known as pilot controlled dry systems. The valve of such a respective configuration has the further technical means which are usual in this art and the description of which is dispensed with here to provide a concise description. In operation the above-mentioned types of valve primarily differ in the way in which the pressure levels in the different valve chambers change. In operation of a wet alarm valve for example a certain fluid pressure $p2$ occurs in the fluid outlet chamber filled with extinguishing fluid, with the sprinkler nozzles closed, while a pressure $pi$ prevails in the fluid inlet chamber. The pressures $pi$ and $p2$ can be approximately equal or equal and are preferably in the range of 1 to 25 bars. The pressure in the fluid outlet chamber ($p2$) falls as soon as the sprinkler nozzles open. As soon as a given pressure drop between $p2$ and the pressure $pi$ is reached or exceeded in the fluid inlet chamber, the closing body of the valve opens with a time delay, whereby the pressure $pi$ in the fluid inlet chamber also changes. The hitherto static pressure firstly falls immediately after opening of the valve and a fresh pressure $p3$ gradually prevails, defined as a flow pressure. If the valve has an alarm passage in which ambient pressure prevails in the blocking position of the closing body, a pressure rise is to be noted in that alarm passage with opening of the valve to the release position.

In the case of dry alarm valves the fluid outlet chamber (downstream of the closing body) is filled with a gas under an increased pressure, preferably at $p2$ of 0.8 to 4 bars. The fluid inlet pressure is preferably water-filled with $pi$ in a range of 1 to about 25 bars, the pressure details being respectively relative to ambient pressure. If the valve has an alarm passage in which ambient pressure prevails in the blocking position of the closing body, a rise in pressure is to be noted in that alarm passage with opening of the valve to the release position.

Preferably the fire extinguishing system valve has up to three pressure sensors which are integrated in the valve and which respectively monitor the pressure in the fluid inlet chamber, the fluid outlet chamber and/or the alarm passage.

Wet alarm valves are described for example in EN 12259-2, dry alarm valves in EN 12259-3 and spray water valves in prEN 12259-9. In addition those valve types are described in the test and approval specifications of private installations like VdS Schadenverhutung, Cologne, FM Global, West Gloucester or UL, Northbrook.

In a second aspect the disclosure concerns a fire extinguishing system, in particular a sprinkler system, having one or more fluid lines in which a fire extinguishing system valve for blocking and releasing the fluid lines is arranged.

In such a fire extinguishing system the disclosure attains the above-indicated object in that the fire extinguishing system valve is in accordance with one of the preferred embodiments described hereinbefore.

Accordingly the fire extinguishing system which is of such a configuration enjoys the same advantages and involves preferred embodiments which were also described hereinbefore with reference to the fire extinguishing system valve. At this juncture attention is directed to the foregoing description. In a preferred development of the fire extinguishing system a fire extinguishing valve is used, having a data interface, wherein the fire extinguishing system has a data processing unit connected to the fire extinguishing valve for reading out the data interface.

Preferably the data processing unit is adapted to analyse the information read out from the data interface and in dependence on that analysis to trigger one, more or all of the following events:
output of a message as to whether the fire extinguishing valve is operating correctly,
output of a message as to whether there is a sufficiently high fluid pressure in the fluid line, and/or
output of a message as to whether the fire extinguishing valve has been opened.

The term message is used in this respect in accordance with the following non-definitive list to denote an optical and/or acoustic signal, preferably with a pre-defined signal sequence, and further preferably for remote transmission an SMS, telephone or VOIP speech message, fax message, e-mail, IRC message, message in the form of an electronic push and pull notification, Internet protocol-based message, Ethernet protocol-based message and the like. The content of those messages is preferably stored in message data files. In a further configuration of the disclosure the above-mentioned messages or message data files and/or state information are sent by the fire extinguishing system valve itself. State information is preferably information/signals about the change in the blocking or release state of the closing body of the fire extinguishing system valve, pressure values or notifications about pressure limit values being exceeded or undershot. For that purpose the data memory has predetermined message data files and/or at least one predefined pressure limit value. In dependence on the detected pressure values of the pressure sensor and comparison with the at least one predefined pressure limit value, preferably by the electronic evaluation unit, a message data file associated with that at least one predefined limit value is sent by the electronic evaluation unit, preferably by way of the data interface, when the pressure rises above or falls below the at least one predefined limit value. Reading-out of the data memory and/or an update of embedded software of the electronic evaluation unit and/or changing or inputting the at least one pressure limit value and/or one or more message data files is implemented by way of a configuration means at a configuration interface which the fire extinguishing system valve or its housing has. In a particularly preferred embodiment that configuration interface is integrated in the housing cover of the fire extinguishing system valve.

The configuration means is preferably selected from the non-definitive list of the following device: notebook, iPad, smartphone, programming device, service device.

Reading-out of the data memory and/or an update of embedded software of the electronic evaluation unit and/or changing or inputting the at least one pressure limit value and/or one or more message data files is effected in an alternative embodiment by way of the data interface, preferably by means of the fire signalling and/or extinguishing control center The disclosure concerns as a further step a method of state monitoring of a fire extinguishing system valve.

The disclosure attains its object, in particular when using the fire extinguishing system valve according to the disclosure, with the following steps: detecting a pressure value in the fluid inlet chamber and/or the fluid outlet chamber; predetermining a pressure limit value; communicating state information and/or a message, in particular in the form of a message data file, to one or more predefined receivers, in particular when the detected pressure value rises above or falls below the predetermined pressure limit value and/or a change in the blocking or release state of the fire extinguishing system valve, in particular when the detected pressure value rises above or falls below the predetermined pressure limit value.

In that respect the method according to the disclosure involves the same realizations and advantages as the fire extinguishing system valve according to the disclosure, for which reason attention is directed in that respect to the foregoing description. The method also the same advantageous developments. The above-described suitabilities and functions of the fire extinguishing system valve are preferably implemented in the form of steps of the method.

In a preferred development presetting is effected by selecting or setting a pressure switch.

Prior to the method step of communicating state information a comparison of the detected pressure value with at least one predefined pressure limit value present for example in a data memory is preferably effected.

Preferably the predefined receiver used is a display unit arranged at or in the housing or the housing cover of the fire extinguishing system valve.

The predefined receiver alternatively or additionally preferably represents a fire signalling and/or extinguishing control center The at least one predefined pressure limit value and/or the message are preferably transmitted by way of the data interface or a dedicated configuration interface which the fire extinguishing system valve or its housing has and which is integrated in the housing cover. Presetting of and/or alteration of the pressure limit valve are preferably input by means of a configuration means and stored in a provided data memory. The configuration means is preferably an operating panel communicating with the data interface or configuration interface, for example a keypad, in particular of a connected stationary or portable personal computer, handheld, smartphone or the like.

Insofar as the words "and/or" were used hereinbefore that is deemed to mean that one, more or all of the elements referred to in the list can be meant.

The word "having" is to be interpreted as a non-definitive list.

DRAWINGS

The disclosure is described in greater detail hereinafter with reference to the accompanying Figures and by means of a preferred embodiment by way of example.

In the Figures.

DETAILED DESCRIPTION

Figure 1:
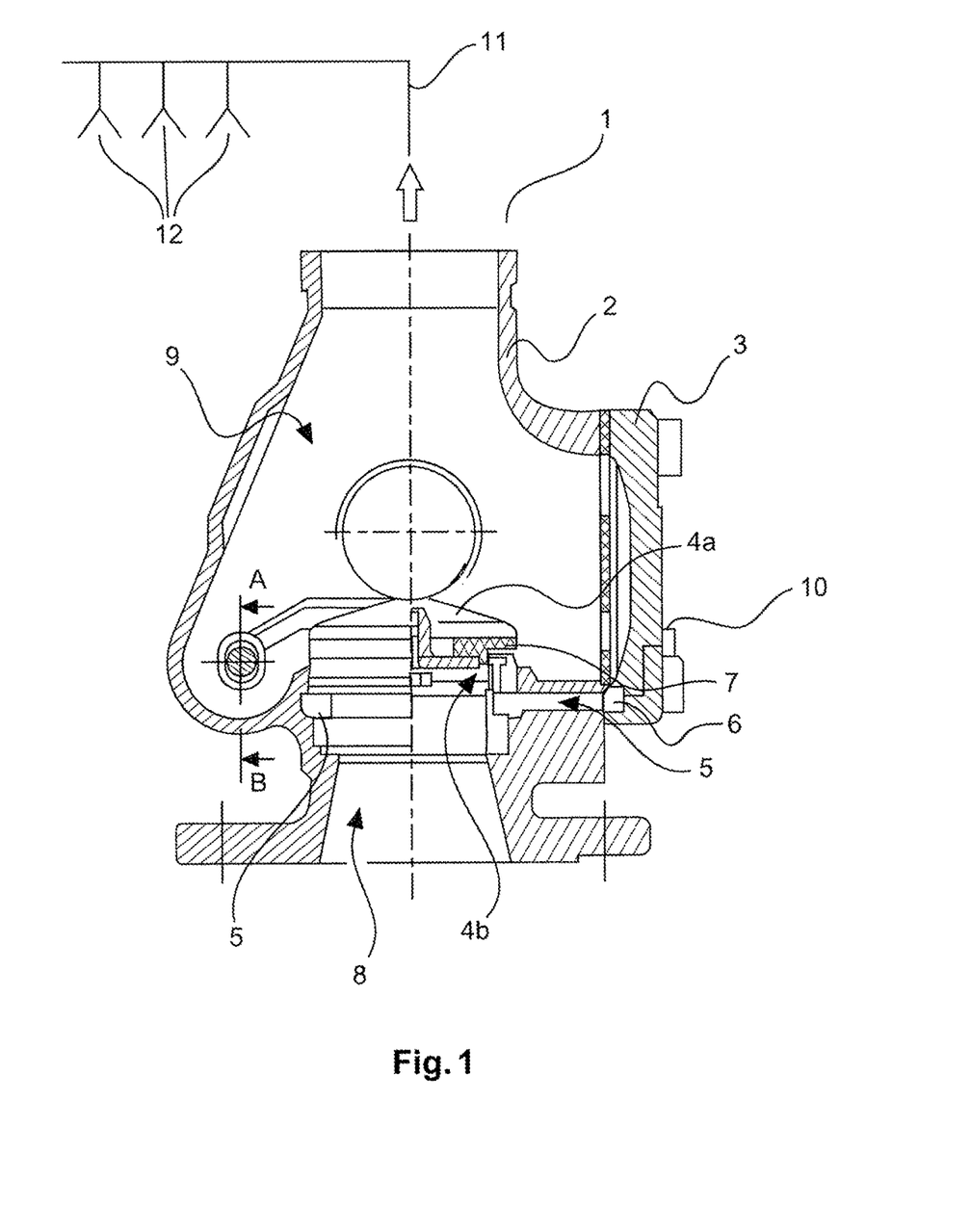
FIG. 1 shows a diagrammatic cross-sectional view of a fire extinguishing system valve according to the preferred embodiment, FIGS. 2a and b show diagrammatic views of a housing cover for the fire extinguishing system valve of FIG. 1.

A fire extinguishing system valve 1 according to the present disclosure is shown in FIG. 1. A preferred configuration is shown in the form of a wet alarm valve. The fire extinguishing system valve 1 has a housing 2. A housing cover 3 is a component part of the housing 2 and is fluid-tightly screwed thereto.

Arranged in the interior of the housing 2 is a closing body 4a on a valve seat 4b, a seal 7 provides for fluid-tight separation of the fluid inlet chamber 8 and the fluid outlet chamber 9 with respect to the alarm passage 5. The closing body 4a is reciprocable between a blocking position (shown in FIG. 1) and a release position. Reciprocable includes not only a translatory but also a rotatory and other form of movement. In the release position (not shown) a fluid inlet chamber 8, and a fluid outlet chamber 9, in the interior of the housing 2, are fluid-conductingly connected together.

The alarm passage 5 which communicates with the valve seat 4b and in which a pressure sensor 6 is operatively arranged is integrated in the housing 2. The pressure sensor 6 is integrated in the housing cover 3 of the housing 2. A data interface 10 is passed outwardly by way of a signal-conducting connection and can be picked up from the outside on the housing cover 3.

The extinguishing system valve 1 can be arranged for example in a fluid line 11 which is adapted to feed extinguishing fluid to one or more sprinkler nozzles 12.

Figure 2A:
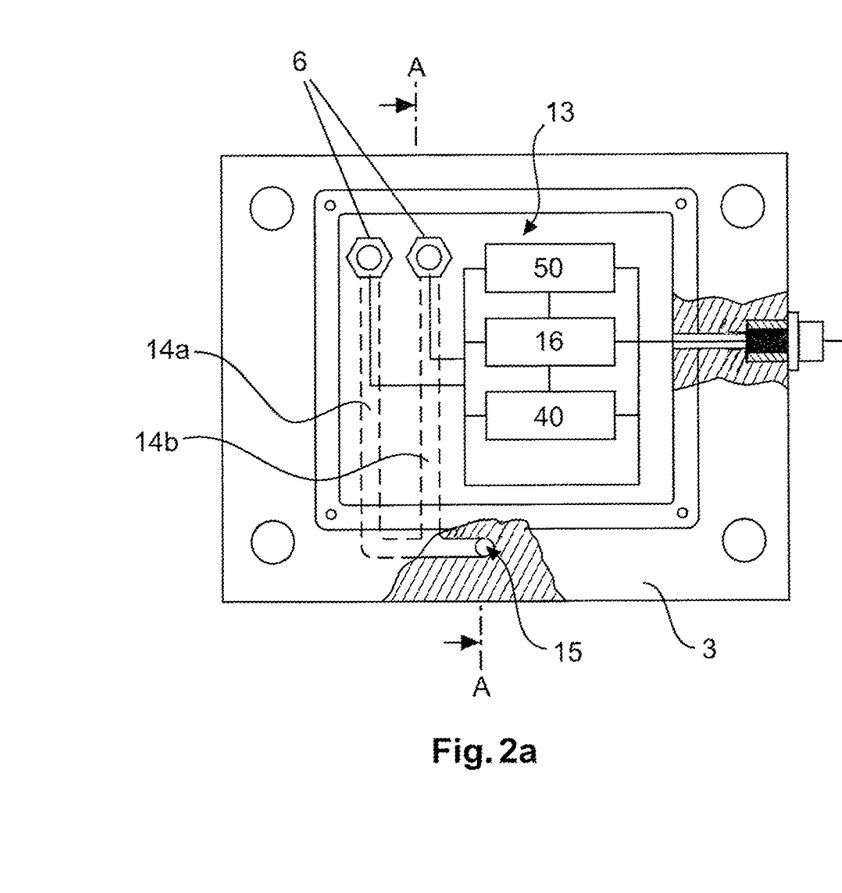
Figure 2B:
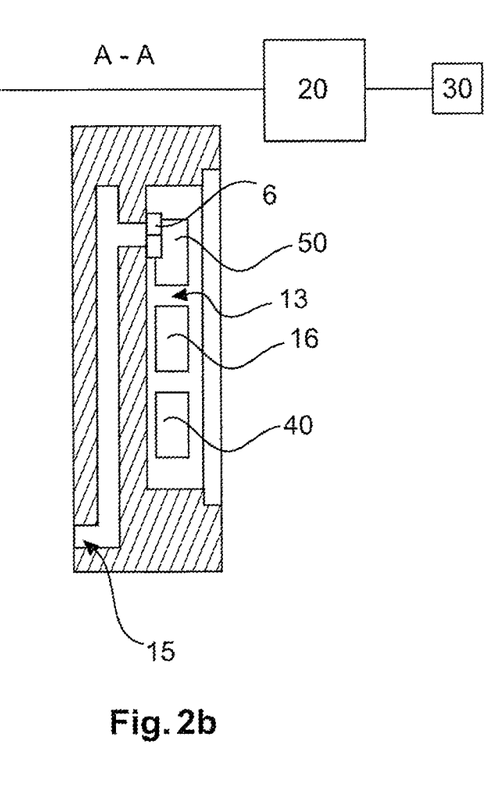

The housing cover 3 of the housing 2 which is preferably in the form of a hand hole cover is diagrammatically shown in FIGS. 2a, b. In the illustrated embodiment the housing cover 3 has a recess 13 which is provided with a transparent cover member and which is recessed in the side that is towards the housing 2 in the fitted state of the housing cover 3. Arranged in the recess 13 are a first and a second pressure sensor 6 respectively connected by way of a fluid line 14a, b as a redundant system to a fluid port 15. The fluid port 15 is so positioned that when the housing cover 3 is fitted on the housing 2 it is connected in fluid-conducting relationship to the alarm passage 5. As an alternative to the arrangement shown here a plurality of pressure sensors could also be connected to different fluid ports, wherein each fluid port is brought into fluid-conducting communication with another fluid chamber of the housing in order to be able to simultaneously measure the different prevailing pressures at various locations of the housing.

The pressure sensors 6 are respectively connected in signal-conducting relationship to an evaluation unit 50. The pressure sensors 6 and the evaluation unit 50 are communicated with each other in such a way that the evaluation unit 50 can detect and process the pressure data output by the pressure sensors 6. The evaluation unit 50 is connected in data-connecting relationship to a data memory 16 and is adapted to store data processing results in the data memory 16 and/or to read in and process data stored in the data memory, in particular pressure data, from the pressure sensors 6.

Optionally the data memory 16 is alternatively or additionally directly connected to the pressure sensors 6 in data-conducting relationship in order to store pressure data received from same.

The evaluation unit 50 is optionally alternatively or additionally connected in data-conducting relationship to a display unit 40 and is adapted to feed the display unit 40 with information which can be called up, in particular state information of the fire extinguishing system valve 1.

The various possible data connections between the pressure sensors, the evaluation unit 50, the data memory 16 and the display unit 40 as well as the data interface 10 are shown by way of example by lines in FIG. 2a.

The data memory 16, the display unit 40, the electronic evaluation unit 50, the pressure sensors 6 and the data interface 10 are functionally independent units which as an alternative to the embodiment shown by way of example can also be integrated in separate recesses or mounting means in the housing 2 or in the housing cover 3. Depending on the respective functional content of the fire extinguishing system valve, that is desired by the customer, preferred embodiments provide that not all of the illustrated elements but only individual elements or sub-combinations of the elements are integrated in the housing or the housing cover.

As can also be seen from FIGS. 2a, b the data interface 10 is optionally connected to a data processing unit 20 in a fire extinguishing system by way of remote data transmission means. The data processing unit 20 is for example part of a fire signaling center. The data processing unit is adapted to process the information read in from the data interface 10 and/or to pass it on, for example to output it to external display means 30 and/or in the form of (alarm) notifications, depending on what kind of state information the data interface 10 provides.

As an alternative to the integration in the housing cover as shown here, one, more or all of the integrated elements shown in FIGS. 2a and 2b can be integrated in another region of the housing 2 of the fire extinguishing system valve 1, or for example also in an intermediate flange fitted between the main housing 2 and the housing cover 3. The basic mode of operation is preferably the same as in the embodiment shown here.

Figure 3:
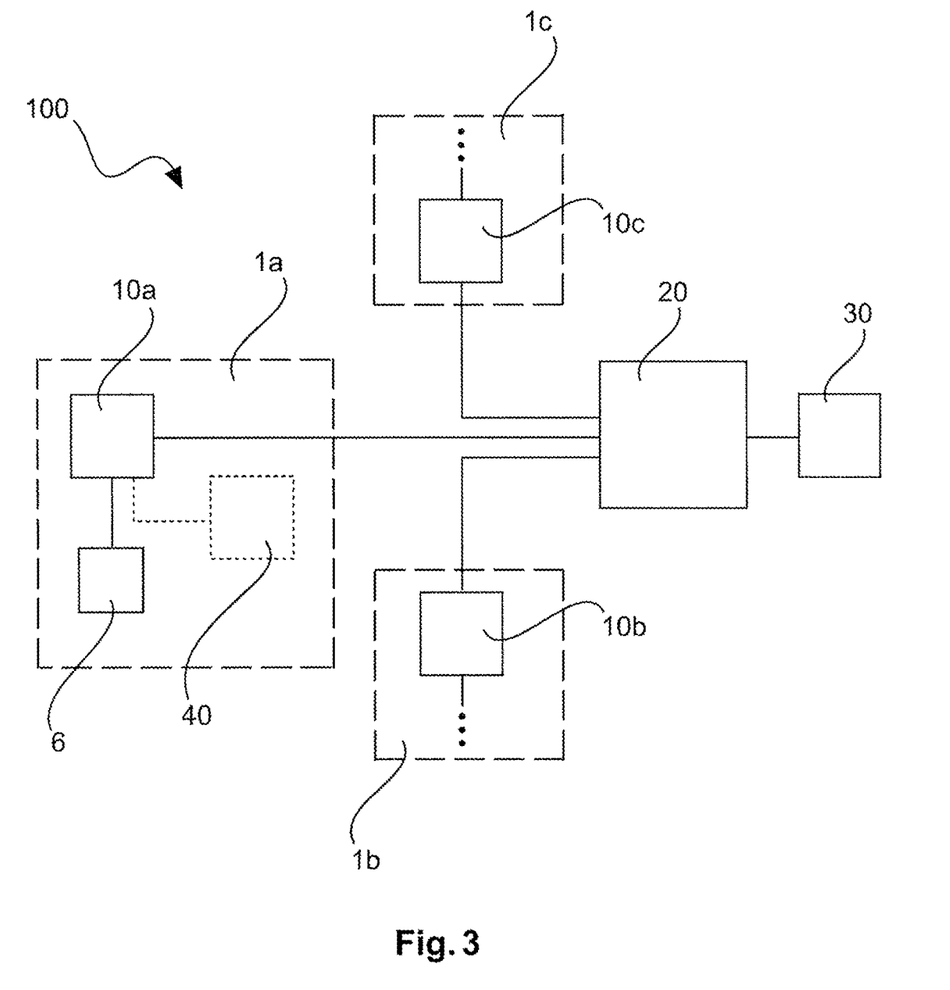
FIG. 3 shows a diagrammatic view of a fire extinguishing system according to a preferred embodiment.

FIG. 3 diagrammatically shows supplemental to FIGS. 2a, b a fire extinguishing system 100. The fire extinguishing system 100 shown by way of example in FIG. 3 monitors a plurality of fire extinguishing system valves 1a, b, c insofar as it communicates in data-conducting relationship with respective data interfaces 10a, b, c provided at the fire extinguishing system valves 1a, b, c and calls up state information provided thereby. The state information is processed in a data processing unit 20 and for example either passed to external display means 30 or returned to the fire extinguishing system valves 1a, b, c and reproduced there on internal display units 40. Optionally the data processing unit 20 is adapted to control the valves 1a, b, c by means of suitable control commands, for example to close or open the closing bodies thereof.

The fire extinguishing system shown in FIGS. 1 to 3, in particular the fire extinguishing system valve shown in FIGS. 2a, b preferably operates in operation in such a way that at least one of the pressures in the fluid inlet chamber and/or fluid outlet chamber and/or in the alarm passage is permanently monitored. The pressure data obtained in that way are processed by the electronic evaluation unit 50 or the data processing unit 20, in particular being compared to predetermined limit values. Deviations from a target pressure pattern or situations where the pressure rises above or falls below the predetermined limit values are recorded for example in the data memory 16 of the fire extinguishing system valves or a data memory (not shown) of the data processing unit 20. If for example the pressure in the fluid inlet chamber drops although the closing body is signaled as being in the blocking position then the data processing unit is preferably adapted to output a corresponding fault signal. If for example the pressure in the alarm passage—which in the readiness condition is at atmospheric pressure—rises due to opening of the alarm valve then the data processing unit is preferably adapted to output a corresponding alarm signal.

If for example the pressure in the fluid outlet chamber falls below a given limit value, for example after triggering of the sprinkler nozzles, being the value below which the closing body should open but in spite of the signal from the valve that the closing body is in the release position, no change in pressure occurs in the fluid inlet region, then the data processing unit is preferably adapted to also output for that purpose a corresponding signal for the presumed disruption.

In a similar manner, the occurrence of leaks or other functional disruptions can be remotely detected by means of ongoing pressure monitoring in the interior of the fire extinguishing system valve. Manual maintenance interventions can then be started in specifically targeted fashion. That is especially the case if the location and the type of the fire extinguishing system valve are also communicated in the state information in respect of the valve, and if there is a clear text display. That simplifies briefing the maintenance personnel with instructions.

LIST OF REFERENCES 1, 1a, b, c fire extinguishing system
2 valve
3 housing cover
4a closing body
4b valve seat
5 alarm passage
6 pressure sensor
7 seal
8 fluid inlet chamber
9 fluid outlet chamber
10, 10a, b, c data interface
11 fluid line
12 sprinkler nozzle
13 recess
14a, b fluid line
15 fluid port
16 data memory
20 data processing unit
30 display means
40 display unit
50 evaluation unit
100 fire extinguishing system

The invention claimed is:

1. A fire extinguishing system valve (1), comprising:
a housing (2, 3) which has a fluid inlet chamber (8), a fluid outlet chamber (9) and a closing body (4a) reciprocable between a blocking state and a release state, wherein the fluid inlet chamber (8) and the fluid outlet chamber (9) are separated from each other in the blocking state and communicate with each other in fluid-conducting relationship in the release state, and a housing cover removably secured to the housing between the fluid outlet chamber and an exterior of the housing;
at least one pressure sensor (6) integrated in the housing (2, 3);
an alarm passage (5) integrated in the housing (2, 3), the alarm passage being sealed off from the fluid chambers (8, 9) in the blocking state and communicating with the fluid chambers (8, 9) in the release state, and
a fluid port (15) integrated in the housing cover; the fluid port being in fluid-conducting relationship with the alarm passage (5);
wherein the at least one pressure sensor (6) includes a first pressure sensor and a second pressure sensor, each of the first pressure sensor and the second pressure sensor in direct fluid communication with the fluid port (15) and adapted to detect a pressure prevailing in the alarm passage (5).

2. A fire extinguishing system valve according to claim 1, wherein the at least one pressure sensor further comprises a pressure sensor (6) adapted to detect a pressure prevailing in the fluid inlet chamber (8).

3. A fire extinguishing system valve according to claim 1, wherein the at least one pressure sensor further comprises a pressure sensor (6) adapted to detect a pressure prevailing in the fluid outlet chamber (9).

4. A fire extinguishing system valve according to claim 1, further comprising a display unit (40) integrated in the housing (2, 3).

5. A fire extinguishing system valve according to claim 4, wherein the at least one pressure sensor (6) is connected to the display unit for output of at least one of: the prevailing pressure, or information ascertained in dependence on the prevailing pressure.

6. A fire extinguishing system valve according to claim 1, wherein the at least one pressure sensor (6) is connected to a data memory (16) for storing the prevailing pressure data.

7. A fire extinguishing system valve according to claim 6, wherein a display unit (40) is connected to at least one of: the data memory (16), or one or more external pressure sensors, and is adapted to output the pressure data stored there or communicated therefrom.

8. A fire extinguishing system valve according to claim 6, wherein at least one of: the at least one pressure sensor (6), the data memory (16), or one or more external pressure sensors are connected to a data interface (10) for reading out and remote transmission of the pressure data.

9. A fire extinguishing system valve according to claim 1, comprising an electronic evaluation unit (50) for receiving data and/or communicating a state information of the valve (1), wherein the electronic evaluation unit is connected to one, more or all of the following elements:
the at least one pressure sensor (6),
a display unit (40),
a data interface (10),
a data memory (16), or
one or more external pressure sensors.

10. A fire extinguishing system valve according to claim 9, wherein the electronic evaluation unit (50) is adapted to compare pressure data from at least one of: the at least one pressure sensor (6), the data memory (16), or the one or more external pressure sensors to predefined limit values and when a value of the pressure data rises above or falls below said limit values to communicate a representative signal as status information.

11. A fire extinguishing system valve according to claim 9, wherein the closing body (4) has a control drive and the electronic evaluation unit (50) is adapted to selectively move the closing body (4) into the release and into the blocking position by the control drive.

12. A fire extinguishing system valve according to claim 1,
wherein one, more or all of the following elements are integrated in the housing (2, 3):
a display unit (40),
a data interface (10),
a data memory (16), or
an electronic evaluation unit (50).

13. A fire extinguishing system valve according to claim 1,
wherein the a housing cover (3) comprises a hand hole cover, and further comprises a first fluid line (14a) in fluid communication with the fluid port (15), and a second fluid line (14b) in fluid communication with the fluid port (15), wherein the first pressure sensor is in fluid communication with the first fluid line and the second pressure sensor is in fluid communication with the second fluid line.

14. A fire extinguishing system valve according to claim 13, wherein one, more or all of the following elements are integrated in the housing cover (3):
   the at least one pressure sensor (6),
   a display unit (40),
   a data interface (10),
   a data memory (16), or
   an electronic evaluation unit (50).

15. A fire extinguishing system valve according to claim 1,
   wherein the fire extinguishing system valve (1) is a wet alarm valve or a dry alarm valve or a spray water extinguishing valve or a pilot-controlled dry alarm valve.

16. A fire extinguishing system (100), comprising:
   one or more fluid lines (11) in which is arranged a fire extinguishing system valve (1) according to claim 1 for blocking and releasing the one or more fluid lines (11).

17. A fire extinguishing system according to claim 16,
   wherein the fire extinguishing system valve (1) has a data interface (10) and the fire extinguishing system (100) is connected to the fire extinguishing system valve (1) for reading out the data interface (10) thereof.

18. A fire extinguishing system according to claim 17, wherein the fire extinguishing system (100) is adapted to analyze the information read out from the data interface (10) and in dependence on that analysis to trigger one, more or all of the following events:
   output of a message as to whether the fire extinguishing valve is operating correctly,
   output of a message as to whether there is a sufficient fluid pressure in the fluid line,
   output of a message as to whether there is not a sufficient fluid pressure in the fluid line, or
   output of a message as to whether the fire extinguishing valve has been opened.

19. A method of state monitoring of a fire extinguishing system valve according to claim 1, comprising the following method steps:
   detecting a pressure value in the alarm passage (5) that is integrated in said valve,
   presetting a pressure limit value, and
   communicating at least one of: status information or a message in the form of a message data file, to one or more defined receivers, preferably if the detected pressure value rises above or falls below the predetermined pressure limit value.

20. A method according to claim 19 wherein the presetting is effected by selection or setting of a pressure switch.

21. A method according to claim 19 wherein prior to method step (c) a comparison of the pressure value to at least one predefined pressure limit value present in a data memory (16) is effected.

* * * * *